Figure 1:
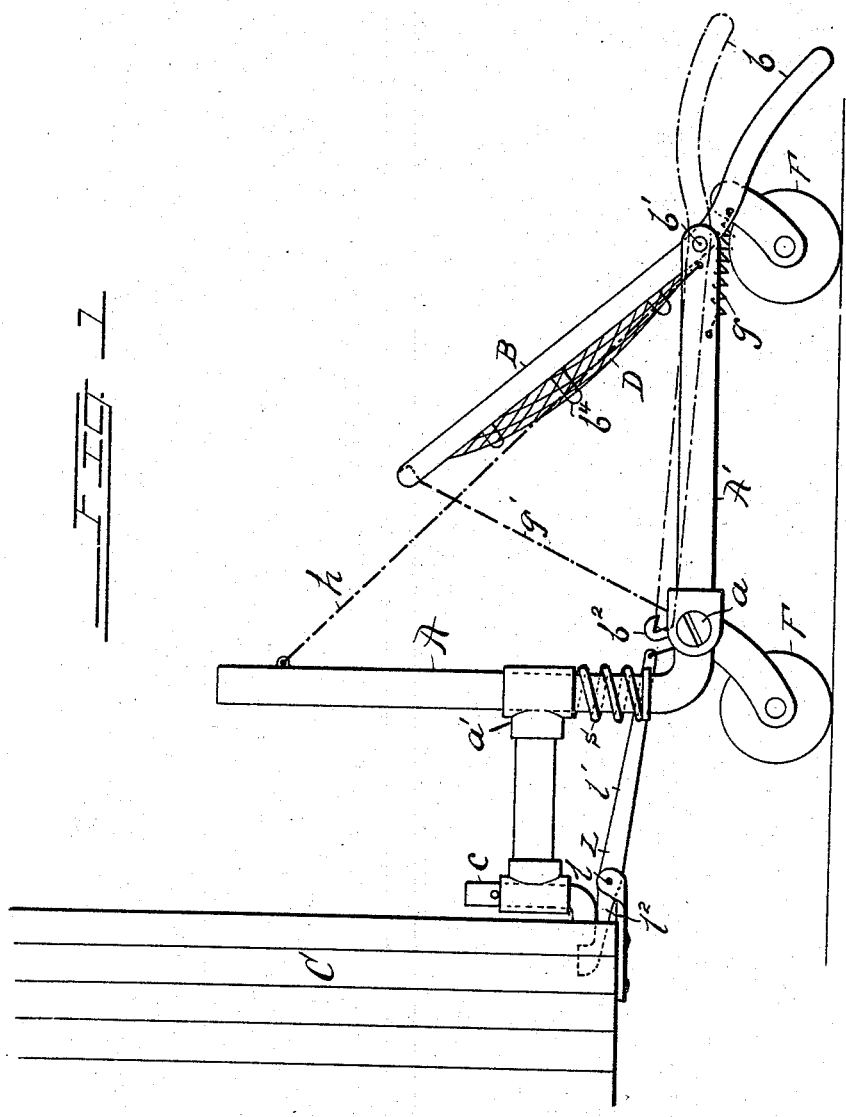

(No Model.) 3 Sheets—Sheet 1.
W. J. KENDALL.
CAR FENDER.

No. 573,415. Patented Dec. 15, 1896.

Witnesses
Carrie Kelly
Oscar Kelly

William J. Kendall, Inventor
By Attorney (No Model.) 3 Sheets—Sheet 2.
W. J. KENDALL.
CAR FENDER.

No. 573,415. Patented Dec. 15, 1896.

FIG. 2

William J. Kendall, Inventor (No Model.) 3 Sheets—Sheet 3.
W. J. KENDALL.
CAR FENDER.
No. 573,415. Patented Dec. 15, 1896.
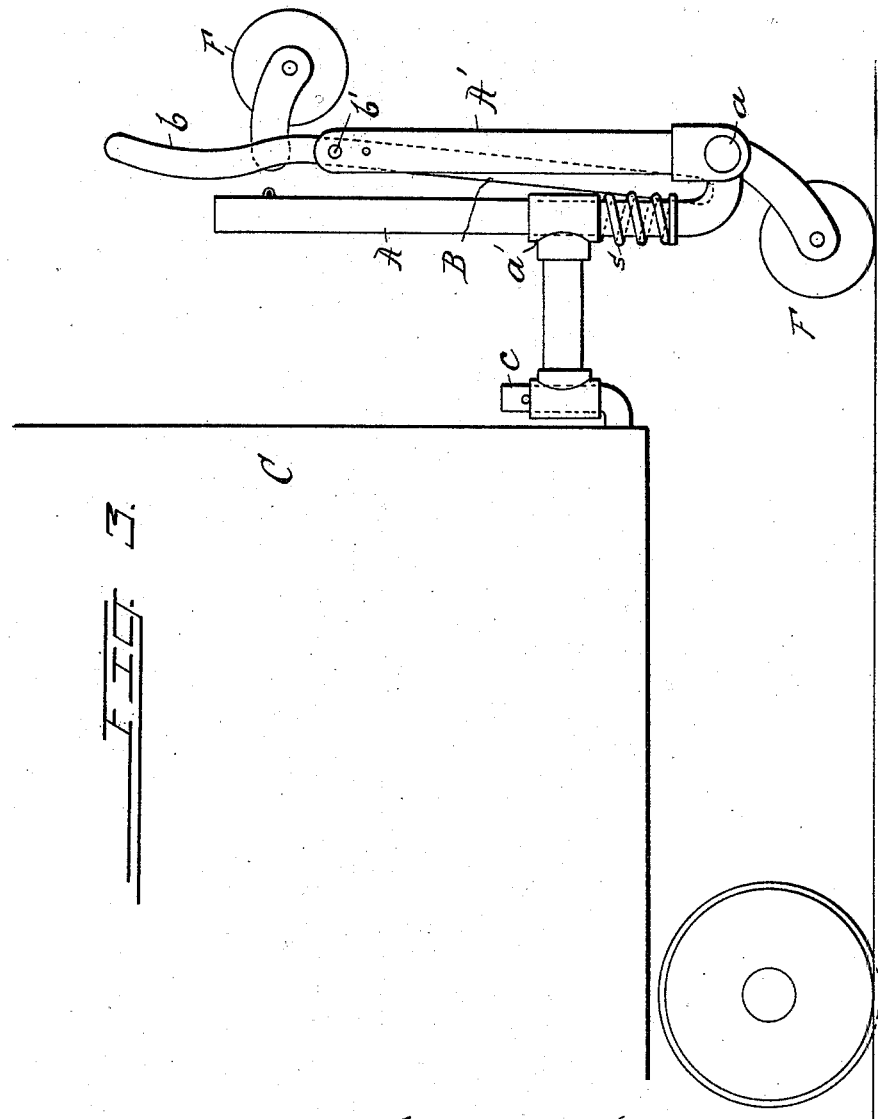
Witnesses
Carrie Kelly
Oscar Kelly
William J. Kendall, Inventor
By Attorney Ed. A. Kelly

UNITED STATES PATENT OFFICE.

WILLIAM J. KENDALL, OF READING, PENNSYLVANIA.

CAR-FENDER.

SPECIFICATION forming part of Letters Patent No. 573,415, dated December 15, 1896.

Application filed May 27, 1896. Serial No. 593,211. (No model.)

*To all whom it may concern:*

Be it known that I, WILLIAM J. KENDALL, a citizen of the United States, residing at Reading, in the county of Berks and State of Pennsylvania, have invented certain new and useful Improvements in Car-Fenders; and I do hereby declare the following to be a full, clear, and exact description of the invention, such as will enable others skilled in the art to which it appertains to make and use the same.

This invention relates to improvements in fenders, and is intended more particularly for use on cars propelled by electricity or cable.

The object of the invention is to produce a fender that will be easily operated by any person or object that may strike it and one that will successfully pick up such person or object.

A further object of the invention is the saving of space in the car-house, and to do this the present invention shows a fender capable of folding against the end of the car and taking up little more space than a car without a fender.

The invention is fully described in the following specification and clearly shown in the accompanying drawings, in which—

Figure 1 is an elevation of my improved fender attached to the end of a car. Fig. 2 is a plan view of the same. Fig. 3 shows the fender folded against the end of the car.

The upright frame A is attached to the body of the car C by means of hangers $c$ and sliding sleeves $a'$.

The swinging portion A' of the frame is pivotally secured to the frame A at a point $a$ and is held in either vertical or horizontal position on said frame by means of pins $a^2$, which fit into registering openings in both frames A A'.

The bed of the fender is pivotally attached at $b'$ to the frame A' and is composed of a frame B, having a widened lower forward end $b$ and provided with a series of concaved rods $b^4$, of any suitable material, running across the entire width of the bed and the whole covered with a suitable netting D.

Across the front of the fender is provided a flexible piece E, of rubber, rope, or other suitable material, adapted to break the shock when striking a person.

The whole fender travels on wheels F, arranged to ride on the edge of the rail.

A spring $g$, attached at one end to the frame A' and at the other end to the lower end of the bed B, is adapted to keep the bed down in position, and a chain $g'$, attached to the upper end of said bed-frame, limits its downward movement. The frame A' is also held in position by means of a chain $h$, which comes into use when the bed B is tilted backward and the wheels F are raised from the rail, as will be hereinafter pointed out.

The action of the fender is as follows: When the fender is in lowered position, as shown in Fig. 1, and an object is struck, the said object falling against it, as it naturally will, will cause the bed B to tilt on its pivotal point $b'$, and the upper end of said bed will be caught and retained by the catch $b^2$ and will be held in horizontal position, thus preventing the said object from rolling off again. The oscillation of the car is taken up by means of the sliding sleeves $a'$, which slide on the frame A and are supported by springs $s$, so arranged as to allow considerable depression before the fender would be affected by the tilting motion of the car.

I provide a lever L, pivoted at a point $l$ to the car, having its long end $l'$ attached to the fender at $l^\times$ and its short end $l^2$ projecting through the front of the car and adapted to be operated by the foot of the motorman. This lever serves to lift the whole fender from the rail when desired, as, for instance, in turning a corner, by merely depressing the end $l^2$ of the lever. It will be observed that the chains $h$ will prevent the forward end of frame A' from dropping when the fender is lifted by said lever.

The frame A' is pivoted at $a$ to the frame A. This is done for convenience in housing the cars provided with this fender, for all that is necessary is to fold the bed B in the frame A' and then the whole fender against the end of the car, Fig. 3, and it will be seen that the additional space consumed by reason of the fender is very small.

There can be four sliding sleeves $a'$ used, if desired, one set above the other, to make a more rigid connection to the car, or the connection can be made by rods running under the bottom of the car and attached to the rod *a*, thus dispensing with the upright frame A.

It is very evident that a number of the details of my construction can be changed at will without affecting the spirit of the invention; but I have shown one form of construction, and, Having fully explained said construction and its manner of operation, what I claim, and desire to secure by Letters Patent, is—

1. The combination with a car-body, of a vertical frame, arms removably secured to said car-body and adapted to retain said vertical frame in position, a forwardly-extended supplemental frame pivotally connected to said former frame, chains connecting said vertical frame and said supplemental frame, a bed or fender pivotally mounted in said supplemental frame, a lever supported by said car-body, connections between said lever and said vertical frame, and a spring-catch adapted to engage the rear end of said bed or fender and hold the same in a lowered position, substantially as set forth.

2. The combination with a car-body, of a vertical frame, arms removably secured to said car-body and adapted to retain said vertical frame in position, a forwardly-extended supplemental frame pivotally connected to said former frame, chains connecting said vertical frame and said supplemental frame, a bed or fender pivotally mounted in said supplemental frame, a spring connected to the lower end of said bed or fender and to said supplemental frame, a chain connected to the upper end of said bed or fender and said main frame, a lever pivotally supported by said car-body, connections between said lever and said vertical frame, and means for holding said fender in a lowered position, substantially as set forth.

3. The combination with a car-body having hooks secured to the forward end thereof, of arms having sleeves on their inner ends adapted to pass over said hooks, said arms also having sleeves on their forward ends, a supporting-frame provided with upright arms extending through said forward sleeves and having flanges thereon, springs located between said sleeves and said flanges, a supplemental frame pivotally supported by said former frame, and a bed or fender pivotally mounted in said supplemental frame, substantially as set forth.

4. The combination with a car-body, of arms connected thereto and having sleeves on their outer ends, a supporting-frame provided with vertical arms extending through said sleeves and having flanges thereon, springs located between said sleeves and said flanges, a supplemental frame pivotally connected to the lower end of said former frame, a bed or fender pivotally mounted in the forward end of said supplemental frame, and a spring-catch adapted to engage and hold said bed or fender in a lowered position, substantially as set forth.

5. The combination with a car-body, of arms connected thereto and having sleeves on their outer ends, a supporting-frame provided with vertical arms extending through said sleeves and having flanges thereon, springs located between said sleeves and said flanges, a supplemental frame pivotally connected to the lower end of said former frame, a bed or fender pivotally mounted in the forward end of said supplemental frame, a lever pivoted to said car-body, connections between said lever and said supporting-frame, and a spring-catch adapted to engage and hold said bed or fender in a lowered position, as and for the purpose set forth.

In testimony whereof I affix my signature in presence of two witnesses.

WILLIAM J. KENDALL.

Witnesses:
ED. A. KELLY,
WM. F. WEBER.